US012420570B2

(12) United States Patent
Veis et al.

(10) Patent No.: US 12,420,570 B2
(45) Date of Patent: Sep. 23, 2025

(54) PRINT ZONE ENCODER

(71) Applicant: HP SCITEX LTD., Netanya (IL)

(72) Inventors: Alex Veis, Netanya (IL); Semion Birger, Netanya (IL)

(73) Assignee: HP SCITEX LTD., Netanya (IL)

( * ) Notice: Subject to any disclaimer, the term of this patent is extended or adjusted under 35 U.S.C. 154(b) by 198 days.

(21) Appl. No.: 17/747,771

(22) Filed: May 18, 2022

(65) Prior Publication Data

US 2022/0402282 A1 Dec. 22, 2022

(30) Foreign Application Priority Data

Jun. 17, 2021 (EP) .................................... 21180012

(51) Int. Cl.
*B41J 11/42* (2006.01)
*B41J 11/00* (2006.01)

(52) U.S. Cl.
CPC .............. *B41J 11/42* (2013.01); *B41J 11/007* (2013.01)

(58) Field of Classification Search
None
See application file for complete search history.

(56) References Cited

U.S. PATENT DOCUMENTS 3,889,801 A 6/1975 Boyer
4,753,119 A 6/1988 Kuspert
5,507,481 A 4/1996 Meyer et al.
5,757,407 A 5/1998 Rezanka
5,931,090 A 8/1999 Ohkawa
5,940,105 A 8/1999 Hayami
6,179,419 B1 1/2001 Rasmussen et al.
6,290,351 B1 9/2001 Merz
6,407,678 B1 6/2002 Elgee et al.
7,914,099 B2 3/2011 Loh et al.
8,839,941 B2 9/2014 Fehr et al.
2002/0018097 A1 2/2002 Kitahara et al.
2003/0038420 A1 2/2003 Cleary et al.
2005/0046667 A1 3/2005 Ando et al.
2006/0186593 A1 8/2006 Shibuya
2007/0045939 A1 3/2007 Toya et al.
2009/0301237 A1 12/2009 Everman
2010/0244364 A1 9/2010 Komiyama et al.
2011/0128557 A1 6/2011 Kinoshita et al.
2011/0293346 A1 12/2011 Sato
2014/0178115 A1 6/2014 Fujisawa et al.
2014/0240423 A1 8/2014 Cressman et al.
(Continued)

FOREIGN PATENT DOCUMENTS

DE 102004045486 A1 5/2005
EP 0193567 B1 12/1987
(Continued)

OTHER PUBLICATIONS

Bell-Everman, "Linear Motion Engineering Guide", Oct. 2018 [Online] Available at: https://www.bell-everman.com/linear-motion-engineering-guide.

*Primary Examiner* — Justin Seo
(74) *Attorney, Agent, or Firm* — Jordan IP Law, LLC

(57) ABSTRACT

In one example, a system to support print media through a print zone in a printer includes an endless support belt, a driver to circulate the support belt through the print zone, and an encoder unit under the print zone to measure movement of the support belt in the print zone.

15 Claims, 6 Drawing Sheets

(56) References Cited

U.S. PATENT DOCUMENTS

| | | | |
|---|---|---|---|
| 2017/0043598 | A1 | 2/2017 | Sanaei et al. |
| 2018/0281472 | A1 | 10/2018 | Terradellas Callau et al. |
| 2019/0291475 | A1 | 9/2019 | Ota |
| 2020/0230981 | A1 | 7/2020 | Gunji |
| 2020/0254789 | A1 | 8/2020 | Martin et al. |

FOREIGN PATENT DOCUMENTS

| | | | | | |
|---|---|---|---|---|---|
| EP | 1655141 | A2 | | 5/2006 | |
| EP | 3121021 | A2 | | 1/2017 | |
| EP | 3150391 | A2 | | 4/2017 | |
| EP | 3308969 | A1 | | 4/2018 | |
| EP | 3392048 | A1 | | 10/2018 | |
| EP | 3594005 | A1 | | 1/2020 | |
| JP | 57-156947 | A | | 9/1982 | |
| JP | 07-187441 | A | | 7/1995 | |
| JP | 07-281495 | A | | 10/1995 | |
| JP | 2008-068938 | A | | 3/2008 | |
| JP | 4057115 | B2 | | 3/2008 | |
| JP | 2017071138 | A | * | 4/2017 | ............. B41J 11/46 |
| JP | 2019-001646 | A | | 1/2019 | |
| WO | 2021/142326 | A1 | | 7/2021 | |

* cited by examiner

PRINT ZONE ENCODER

BACKGROUND

In some large industrial inkjet printers, a vacuum belt is used to hold down corrugated cardboard or other media flat for printing. The vacuum belt forms a loop driven with a pulley at one end of the loop around an idler pulley at the other end of the loop. The print media is carried along the upper run of the belt loop through a print zone in which ink is dispensed on to the print media from a stationary printing unit above the belt.

DRAWINGS

The same part numbers designate the same or similar parts throughout the figures. The figures are not necessarily to scale.

DESCRIPTION

Figure 1:
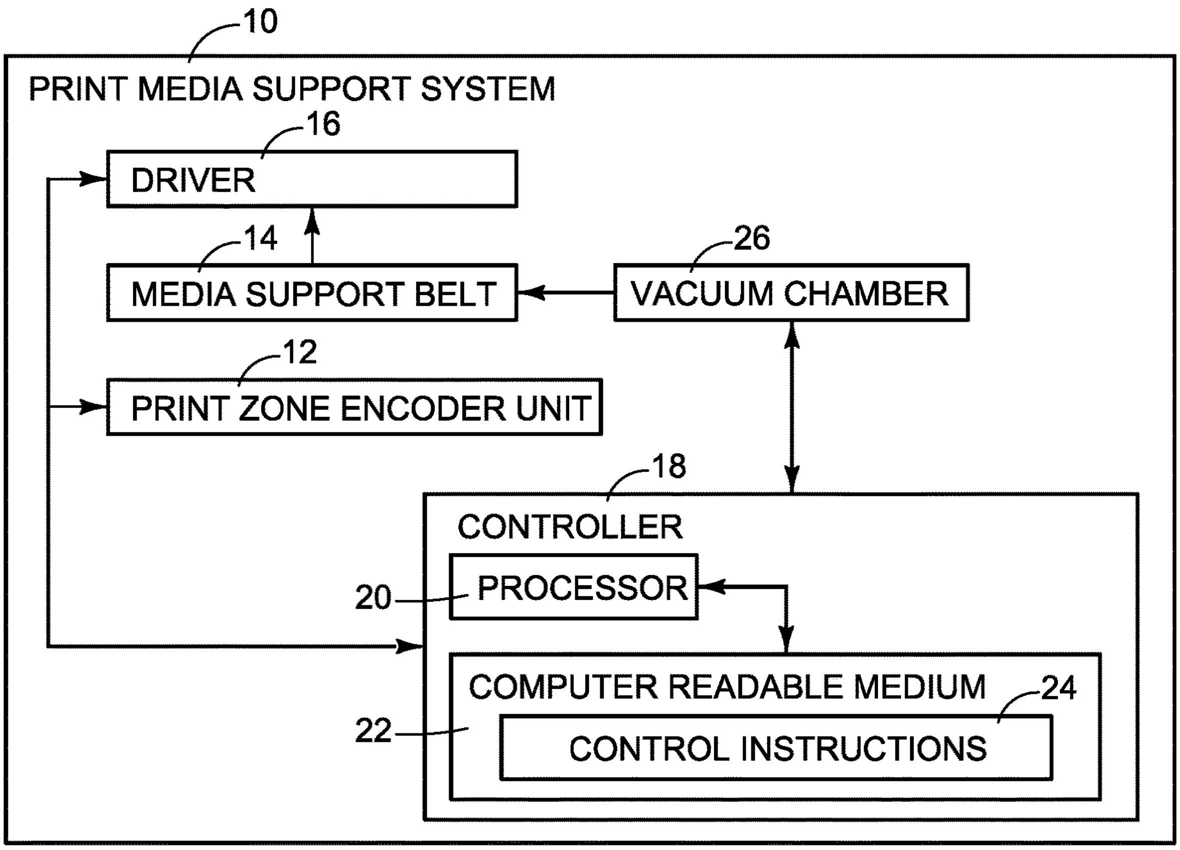
FIG. 1 is a block diagram illustrating one example of a print media support system with a print zone encoder unit.

In some large industrial inkjet printers, a vacuum belt is used to hold down media flat for printing. The vacuum belt forms a loop driven with a pulley at one end of the loop around an idler pulley at the other end of the loop. The print media is carried along the upper run of the belt loop through a print zone in which ink is dispensed on to the media from a printing unit above the belt. The printing unit may include multiple print bars that extend across the full width of the belt to print each of multiple corresponding color planes on to the media in a single pass. A rotary encoder operatively connected to the drive pulley gives feedback to a controller to help regulate the belt speed and/or the timing of the printing unit dispensing ink.

The vacuum holding down the print media applies strong normal forces to the belt as it moves through the print zone, creating friction between the belt and the track that supports the belt. This friction, which is not uniform along the belt, can cause small jumps in belt speed that are not detected by the rotary encoder measuring rotation of the drive pulley located away from the print zone. Also, in response to the substantial operating stresses in an industrial printing environment, a belt drive pulley may develop an eccentric wobble that causes unwanted variations in belt speed through the print zone. Wobble is not detected by a rotary encoder at drive pulley and, consequently, the resulting variations in belt speed are not corrected.

A new system has been developed to help more accurately measure movement of the vacuum belt through the print zone and thus more accurately correct for any unwanted variations in belt speed. An encoder unit is positioned in the print zone and configured to measure movement of the vacuum belt through the print zone. In one example, the encoder unit includes a belt that engages the vacuum belt in the print zone to transfer movement of the vacuum belt to the encoder belt. The encoder unit also includes a pulley and a rotary encoder connected to the encoder pulley. The encoder belt wraps the encoder pulley to turn the pulley in response to the vacuum belt moving through the print zone. The rotary encoder connected to the encoder pulley gives feedback to a controller to help regulate the belt speed and/or the timing of the printing unit dispensing ink based on movement of the vacuum belt in the print zone, including movement caused by friction and pulley wobble.

This and other examples of the print zone encoder measure movement of the vacuum belt in the print zone more directly compared to measuring the rotary movement of a belt drive pulley located away from the print zone. In addition, an idler pulley in the encoder unit is not subjected to the same operating stresses as the belt drive pulley and, therefore, is not likely to wobble even after long use in an industrial environment. In the example noted above, a common belt drive transmission is inverted and used in reverse as an economical way to transfer movement of the vacuum belt to a rotary encoder in the encoder unit. However, other suitable transfer mechanisms are possible. Also, examples are not limited to vacuum belts but may be implemented with other types of moving print media supports. Accordingly, these and other examples described below and shown in the figures illustrate but do not limit the scope of the patent, which is defined in the Claims following this Description.

As used in this document: "and/or" means one or more of the connected things; and a "computer readable medium" means any non-transitory tangible medium that can embody, contain, store, or maintain instructions and other information for use by a processor and may include, for example, circuits, integrated circuits, ASICs (application specific integrated circuits), hard drives, random access memory (RAM), read-only memory (ROM), and flash memory.

Figure 2:
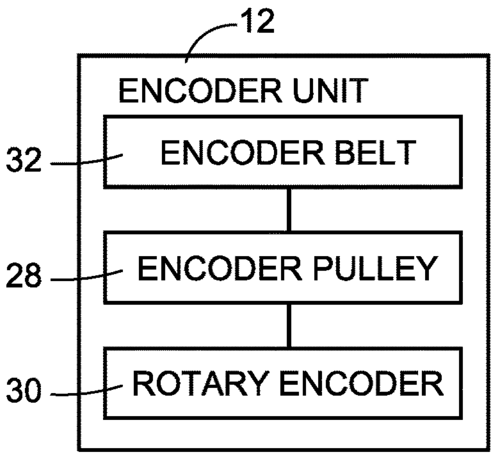
FIG. 2 is a block diagram illustrating an example implementation for a print zone encoder unit in the media support system shown in FIG. 1.

FIG. 1 is a block diagram illustrating one example of a print media support system 10 with a print zone encoder unit 12. FIG. 2 is a block diagram illustrating an example implementation for a print zone encoder unit 12 in the media support system shown in FIG. 1. FIGS. 3-6 are plan and elevation views illustrating an example implementation for a media support system 10 and encoder unit 12 shown in the block diagrams of FIGS. 1 and 2.

Referring to FIG. 1, print media support system 10 includes an endless belt 14 to support corrugated cardboard or other print media for printing, a driver 16 to circulate belt 14 through a print zone, and an encoder unit 12 located under the print zone to measure movement of belt 14 through the print zone. System 10 also includes a controller 18 operatively connected to encoder unit 12 and driver 16. Controller 18 represents the processing and memory resources and the programming, electronic circuitry and components needed to control the operative elements of system 10. Controller 18 may include distinct control elements for individual system components. In the example shown in FIG. 1, controller 18 includes a processor 20 and a computer readable medium 22 with control instructions 24 that represent programming to control driver 16 and thus the speed of belt 14 based on movement measured by encoder unit 12. Controller 18 may also include programming to control a printing unit dispensing ink based on movement measured by encoder unit 12, for example as described below with reference to FIG. 10.

Where media support belt 14 is implemented as a vacuum belt, system 10 may include a vacuum chamber 26 operatively coupled to belt 14 to hold down print media flat on belt 14. Any suitable driver 16 may be used to circulate belt 14. For example, driver 16 may include a drive pulley to circulate the belt, an idler pulley to keep tension in the belt, and a motor operatively connected to the drive pulley to turn the pulley at the direction of controller 18.

FIG. 2 illustrates an example implementation for a print zone encoder unit 12 shown in FIG. 1. Referring to FIG. 2, encoder unit 12 includes an encoder pulley 28, a rotary encoder 30 operatively connected to encoder pulley 28, and an endless belt 32 engaging media support belt 14 in the print zone so that encoder belt 32 moves with media support belt 14. Encoder belt 32 wraps encoder pulley 28 to turn pulley 28 in response to media support belt 14 moving through the print zone. Encoder belt 32 converts linear movement of belt 14 through the print zone to rotation of encoder pulley 28 that is measured by rotary encoder 30. The encoder measurements are used by controller 18 in FIG. 1 to control the speed of support belt 14 and/or the timing of a printing unit dispensing ink based on the movement of support belt 14 in the print zone.

Figure 3:
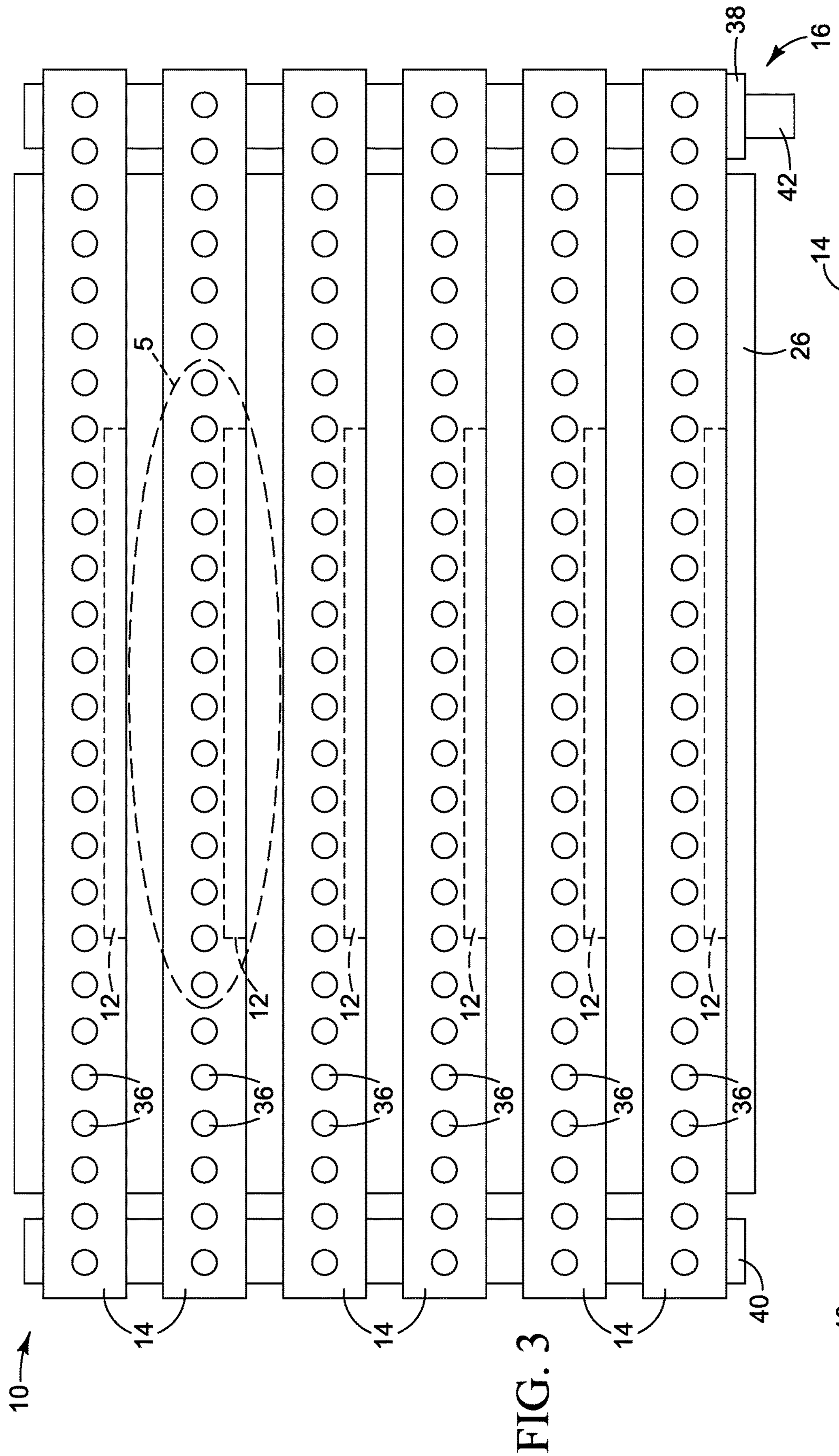
FIGS. 3 and 4 are plan and elevation views, respectively, illustrating one example of a media support system with multiple print zone encoder units.
Figure 4:
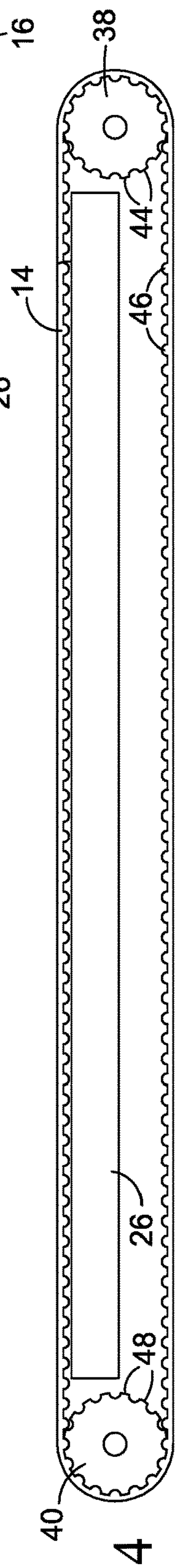
Figure 5:
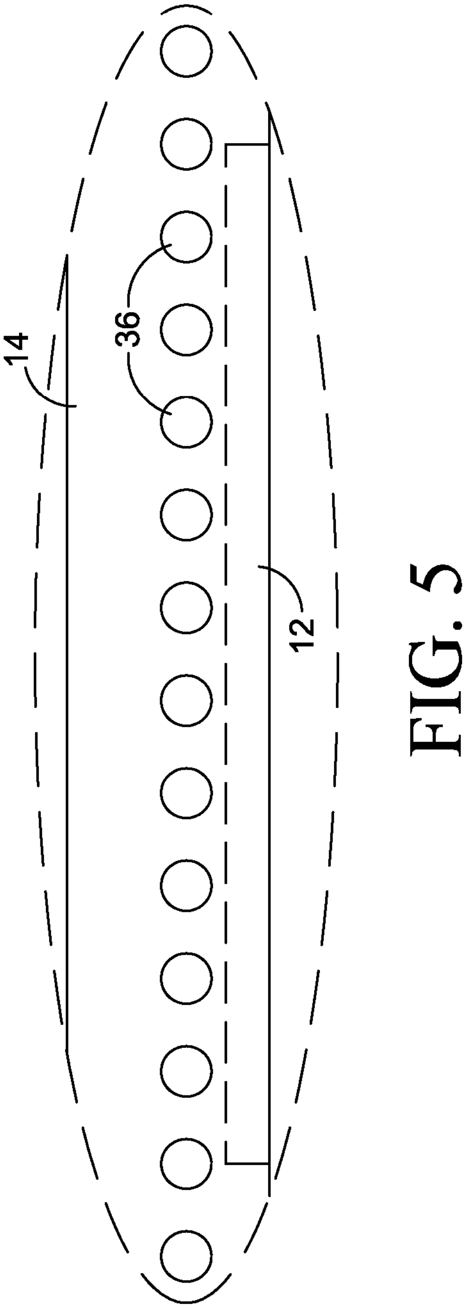
FIG. 5 is a plan view detail from FIG. 3.
Figure 6:
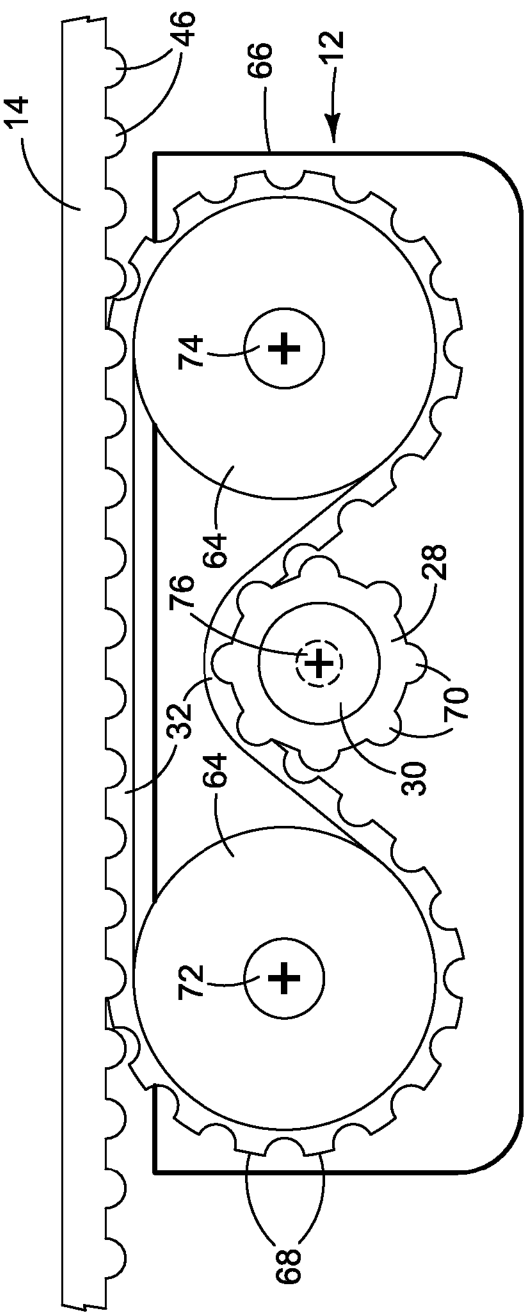
FIG. 6 is an elevation view of the detail of FIG. 5.
Figure 7:
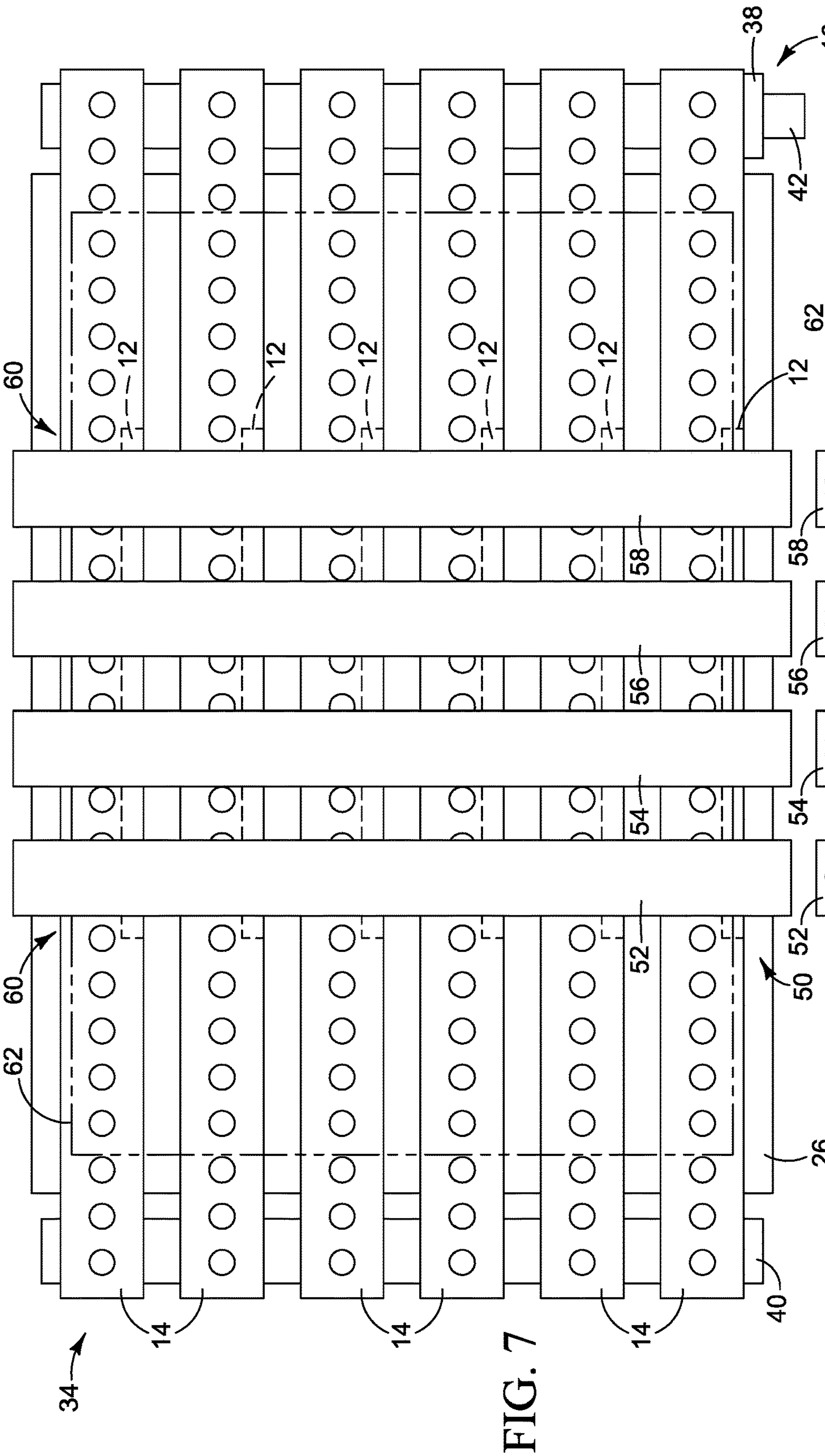
FIGS. 7 and 8 are plan and elevation views illustrating an example inkjet printer with a print media support system from FIGS. 3 and 4.
Figure 8:
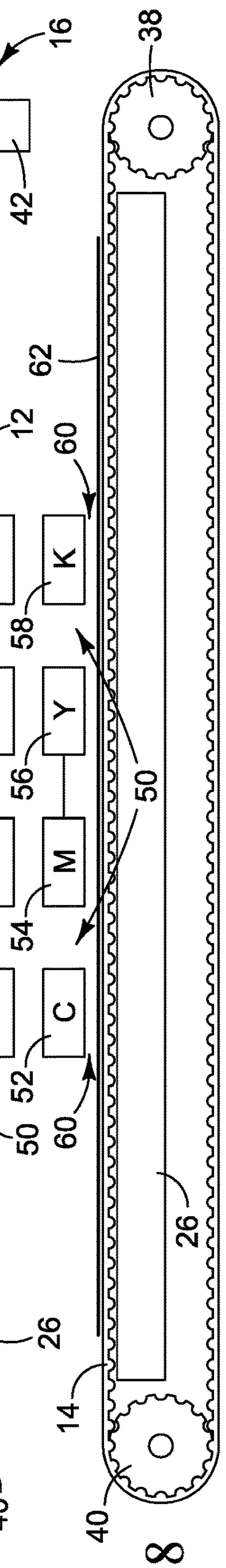

FIGS. 3 and 4 are plan and elevation views illustrating one example of a media support system 10 with print zone encoder units 12. FIG. 5 is a plan view detail from FIG. 3. FIG. 6 is an elevation view of the detail of FIG. 5. FIGS. 7 and 8 are plan and elevation views illustrating an example inkjet printer 34 with a print media support system 10 from FIGS. 3 and 4.

Referring to FIGS. 3-8, system 10 includes multiple toothed print media support belts 14 and a single driver 16 to circulate belts 14. Each belt 14 includes vacuum holes 36 operatively connected to a vacuum chamber 26 along an upper run of the belt. Vacuum chamber 26 is omitted from FIGS. 5 and 6 to not obscure encoder unit 12. Driver 16 includes a drive pulley 38 at one end of the belt loop, an idler pulley 40 at the other end of the belt loop, and a motor 42 to turn drive pulley 38. Teeth 44 on drive pulley 38 engage teeth 46 on belts 14 to circulate belts 14 at the urging of motor 42. Belt teeth 46 engage teeth 48 on idler pulley 40 to turn idler pulley 40 as the belts are circulated by drive pulley 38.

Referring to FIGS. 7 and 8, printer 34 includes a printing unit 50 with print bars 52-58 over belts 14. Printing unit 50 defines a print zone 60 in which ink is dispensed on to print media 62 moving with belts 52-58 under the print bars. Each print bar 52-58 includes one or multiple inkjet printheads that dispense ink on to print media 62 according to "firing" signals timed to produce the desired images at the desired locations on media 62.

Referring to FIGS. 3-8, an encoder unit 12 is positioned under each belt 14 in print zone 60 to measure belt movement through the print zone. In the example shown in FIG. 6, each encoder unit 12 includes a toothed encoder pulley 28, guide pulleys 64, and a toothed encoder belt 32 wrapping pulleys 28 and 64. Each encoder unit 12 also includes a rotary encoder 30 operatively connected to encoder pulley 28 to measure the rotation of encoder pulley 28. Pulleys 28, 64 are mounted to a frame 66 and configured to make the upper run of encoder belt 32 parallel to media support belt 14. A first guide pulley 64 has a first axis of rotation 72, a second guide pulley 64 has a second axis of rotation 74, and encoder pulley 28 has a third axis of rotation 76 between first axis 72 and second axis 74. Teeth 68 on encoder belt 32 engage teeth 46 on media support belt 14 and teeth 70 on encoder pulley 28 so that the linear movement of belt 14 is transferred to encoder belt 32 which is converted to rotation of encoder pulley 28.

Rotary encoder 30 measures the rotation of encoder pulley 28 which represents the linear movement of media support belt 14 in print zone 60 (FIGS. 7 and 8). Accordingly, rotary encoder 30 measures movement of media support belt 14 in print zone 60 indirectly through encoder pulley 28 and belt 32. While it is expected that rotary encoder 30 usually will be implemented as an incremental encoder, any suitable rotary encoder may be used. Also, the configuration of an encoder unit 12 in FIG. 6 is just one example. Other configurations are possible. For one example, it may be possible in some implementations to use a linear encoder to directly measure the movement of a media support belt 14 through the print zone. For another example, it may be possible in some implementations to drive an encoder pulley 28 directly by a media support belt 14.

Figure 9:
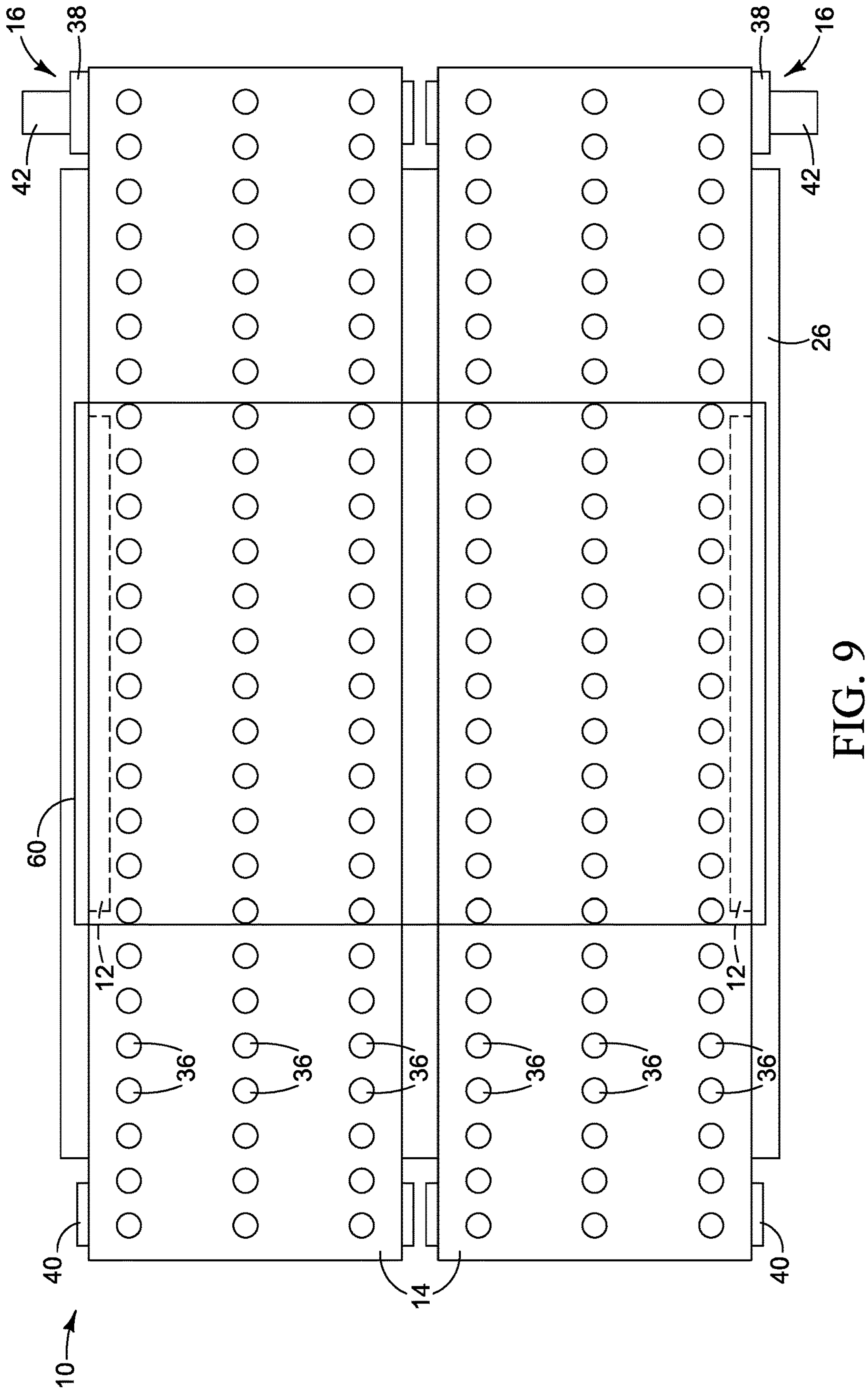
FIG. 9 is a plan view illustrating another example of a media support system with multiple print zone encoder units.

FIG. 9 is a plan view illustrating another example of a media support system 10 with print zone encoder units 12. Referring to FIG. 9, system 10 includes multiple toothed print media support belts 14 and multiple drivers 16 each to circulate a corresponding belt 14. Each belt 14 includes vacuum holes 36 operatively connected to a vacuum chamber 26 along an upper run of the belt. Each driver 16 includes a drive pulley 38 at one end of the belt loop, an idler pulley 40 at the other end of the belt loop, and a motor 42 to turn drive pulley 38. An encoder unit 12 is located under each belt 14 in a print zone 60 where ink is dispensed on to a print media so as to be located directly under at least one printhead 52-58 of printing unit 50.

Figure 10:
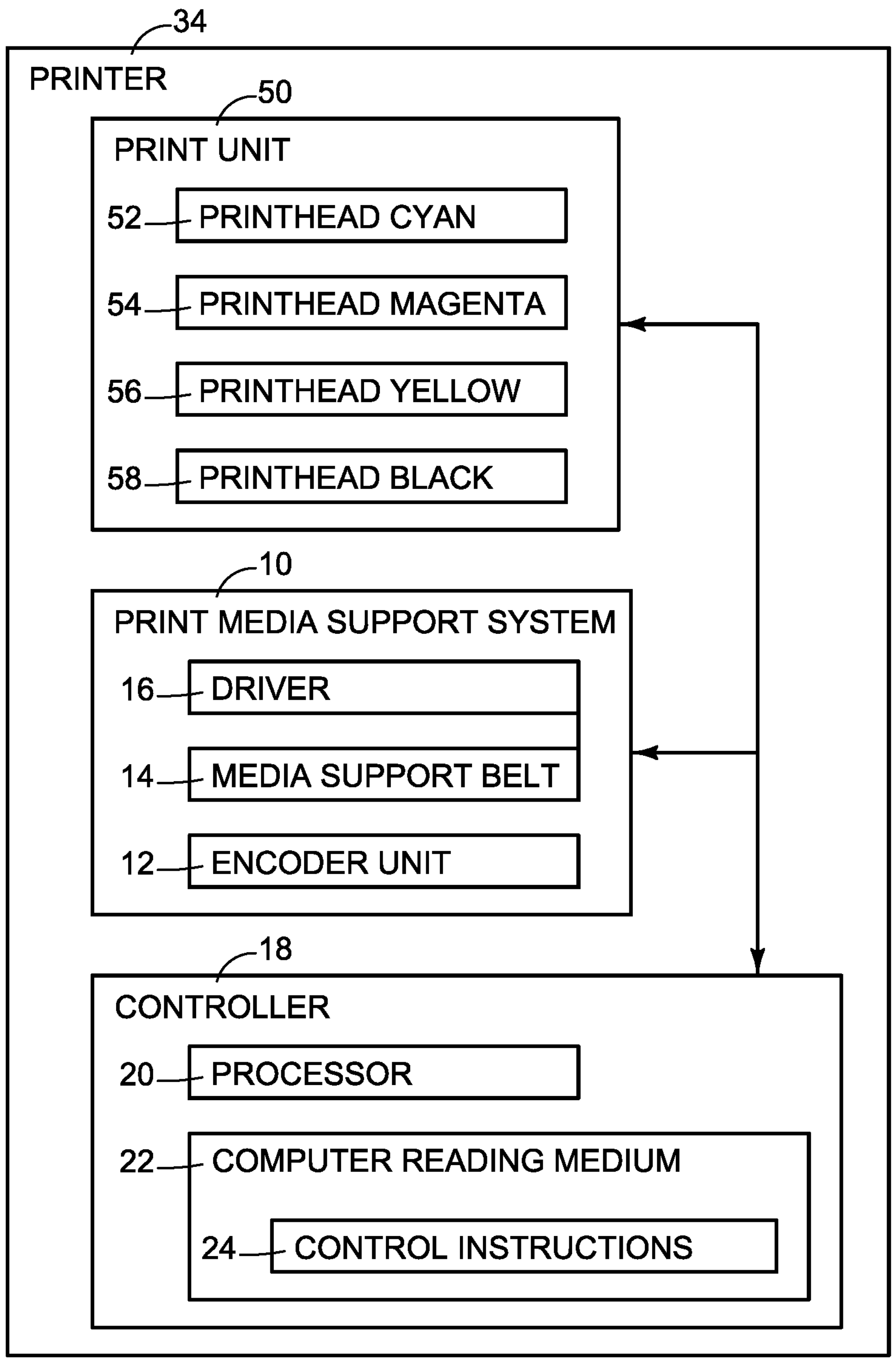
FIG. 10 is a block diagram illustrating an inkjet printer implementing one example of a print media support system with a print zone encoder unit.

FIG. 10 is a block diagram illustrating an inkjet printer 34 implementing one example of a print media support system 10 with a print zone encoder unit 12, such as an encoder unit 12 shown in FIG. 6. Referring to FIG. 10, printer 34 includes a printing unit 50 with printheads 52-58 that define a print zone where ink is dispensed on to print media supported by system 10. Each printhead 52-58 may be implemented, for example, in a print bar 52-58 shown in FIGS. 7 and 8. In this example, each printhead 52-58 dispenses cyan, magenta, yellow, and black ink, respectively. Each printhead 52-58 is operatively connected to a controller 18 executing control instructions 24 to dispense ink according to firing signals timed to produce the desired images at the desired locations on the print media.

Encoder unit 12 measures the movement of media support belt 14 in the print zone and communicates the measurements to controller 18. A processor 20 on controller 18 executing control instructions 24 controls the firing signals for printheads 52-58 based on movement of media support belt 14 measured by encoder unit 12, to produce the desired images at the desired locations on the print media, for example by synchronizing the firing signals to jumps in belt speed and/or wobble in the driver pulleys. Processor 20 on controller 18 executing control instructions 24 may also control belt driver 16 to maintain the desired speed of media support belt 14 through the print zone based on movement of media support belt 14 measured by encoder unit 12, for example by correcting for jumps in belt speed and/or wobble in the driver pulleys.

A print media support system 10 such as that shown in FIGS. 1 and 10 helps maintain a near constant belt/media speed through the print zone. Since movement is measured in the print zone instead of four or five meters away at the belt driver, the system can respond more quickly to help keep speed changes small. Since speed changes cannot be eliminated completely, the timing of printhead firing signals can be adjusted to compensate for any position errors caused by small changes in belt speed.

The examples shown in the figures and described above illustrate but do not limit the patent, which is defined in the following Claims.

"A", "an" and "the" used in the claims means one or more. For example, "a" belt means one or more belts and subsequent reference to "the" belt means the one or more belts.

The invention claimed is:

1. A system to support print media through a print zone in a printer, the system comprising:

an endless support belt;

a driver to circulate the support belt through the print zone, wherein the print zone is defined as an area in which ink is dispensed onto print media by a printing unit having a print head;

an encoder unit directly under the printhead in the print zone and engaging the endless support belt to convert linear movement of the support belt in the print zone to rotation of a rotary encoder; and a controller operatively connected to the encoder unit, the controller programmed to control the driver and/or the printing unit based on movement measured by the encoder unit.

2. The support system of claim 1, wherein the encoder unit comprises:

an encoder pulley, wherein the rotary encoder is operatively connected to the encoder pulley; and an endless encoder belt engaging the support belt in the print zone and wrapping the encoder pulley to turn the encoder pulley in response to the support belt moving in the print zone.

3. The support system of claim 2, wherein:

the driver comprises a toothed drive pulley and a motor to turn the drive pulley;

the endless support belt comprises an endless toothed support belt wrapping the drive pulley;

the encoder pulley comprises a toothed encoder pulley; and the endless encoder belt comprises an endless toothed encoder belt with teeth that engage teeth on the support belt and teeth on the encoder pulley.

4. The support system of claim 1, wherein the controller programmed to control the driver and/or the printing unit based on movement measured by the encoder unit comprises the controller programmed to synchronize a printhead firing signal with movement of the support belt measured by the encoder unit.

5. The support system of claim 1, wherein the controller programmed to control the driver and/or the printing unit based on movement measured by the encoder unit comprises the controller programmed to vary a speed of a driver motor based on movement of the support belt measured by the encoder unit.

6. The support system of claim 1, wherein:

the endless support belt comprises multiple endless support belts;

the driver comprises multiple drivers each to circulate a corresponding one of the support belts through the print zone;

the encoder unit comprises multiple encoder units each located under the print zone to measure movement of a corresponding one of the support belts in the print zone; and the controller is operatively connected to each of the encoder units and each of the drivers, the controller programmed to control each driver and/or the printing unit based on movement measured by the encoder units.

7. The support system of claim 1, comprising a vacuum chamber and holes in the belt operatively connected to the vacuum chamber in the print zone.

8. A print zone encoder unit for a print media support belt, comprising:

an encoder pulley;

a rotary encoder operatively connected to the encoder pulley; and an endless encoder belt configured to engage the support belt in the print zone and to engage and turn the encoder pulley in response to the support belt moving in the print zone.

9. The encoder unit of claim 8, comprising:

a first guide pulley having a first axis of rotation; and a second guide pulley having a second axis of rotation spaced from the first axis;

and wherein:

the encoder pulley has a third axis of rotation between the first axis and the second axis; and the encoder belt wraps the first guide pulley, the encoder pulley, and the second guide pulley with a straight run of encoder belt between the first axis and the second axis.

10. The encoder unit of claim 9, wherein:

the encoder pulley comprises a toothed encoder pulley;

the encoder belt comprises a toothed encoder belt with teeth to engage the support belt in the print zone and wrapping the encoder pulley to engage the teeth on the encoder pulley, to turn the encoder pulley in response to the support belt moving in the print zone.

11. A system to support print media through a print zone in a printer, the system comprising:

an endless support belt having holes therethrough;

a driver to circulate the support belt through the print zone, wherein the print zone is defined as an area in which ink is dispensed onto the print media by a printing unit having a print head;

an encoder unit directly under the printhead in the print zone and engaging the endless support belt to convert linear movement of the support belt in the print zone to rotation of a rotary encoder; and a vacuum chamber operatively connected to at least some of the holes in the support belt in the print zone.

12. The system of claim 11, comprising a controller operatively connected to the encoder unit and the driver, the controller programmed to control the driver and/or the printing unit based on movement measured by the encoder unit.

13. The system of claim 12, wherein the controller programmed to control the driver and/or the printing unit based on movement measured by the encoder unit comprises the controller programmed to synchronize a printhead firing signal with movement of the support belt measured by the encoder unit.

14. The system of claim 12, wherein the controller programmed to control the driver and/or the printing unit based on movement measured by the encoder unit comprises the controller programmed to vary a speed of a driver motor based on movement of the support belt measured by the encoder unit.

15. The system of claim 11, wherein:

the endless support belt comprises multiple endless support belts;

the driver comprises multiple drivers each to circulate a corresponding one of the support belts through the print zone; and the encoder unit comprises multiple encoder units each located under the print zone to measure movement of a corresponding one of the support belts in the print zone.

* * * * *